United States Patent [19]
Tenney, Jr.

[11] 3,951,383
[45] Apr. 20, 1976

[54] TRAILER JACK

[76] Inventor: David N. Tenney, Jr., P.O. Box 1135, Project City, Calif. 96079

[22] Filed: Sept. 19, 1975

[21] Appl. No.: 614,888

[52] U.S. Cl. .............................................. 254/94
[51] Int. Cl.$^2$ ...................................... B66F 7/22
[58] Field of Search ............... 254/45, 86 R, 94; 280/150.5

[56] References Cited
UNITED STATES PATENTS

| | | | |
|---|---|---|---|
| 2,343,459 | 3/1944 | Hines | 254/94 |
| 3,652,056 | 3/1972 | King | 254/94 |
| 3,733,051 | 5/1973 | Bollinger | 254/94 |
| 3,744,757 | 7/1973 | White et al. | 254/94 |
| 3,879,055 | 4/1975 | Sill et al. | 254/45 |
| 3,881,691 | 5/1975 | Colclasure | 254/94 |
| 3,881,746 | 5/1975 | Newcomb | 254/94 |

*Primary Examiner*—Al Lawrence Smith
*Assistant Examiner*—Robert C. Watson
*Attorney, Agent, or Firm*—Lothrop & West

[57] ABSTRACT

A jack is mounted on each longitudinal frame channel aft of the wheels of a trailer. A pivoted leg with a foot plate on one end is pivotally mounted on the frame for rotation in a fore and aft vertical plane. When not in use, the leg is held in horizontal attitude by a latch pin. In the event a trailer tire becomes flat and it is desired to elevate the wheel for replacement, the latch pin is retracted and the leg rotated to a rearward and downward position wherein the toe of the foot plate engages the ground. The trailer is then slowly backed a few inches, causing the leg to tilt into vertical attitude, at which juncture it is locked in place by the latch pin.

Since the leg is longer than the radius of the wheel the wheel is elevated above ground level when the leg is vertical. Wheel replacement is thereby facilitated. The wheel is returned to ground level by reversing the foregoing steps.

4 Claims, 7 Drawing Figures

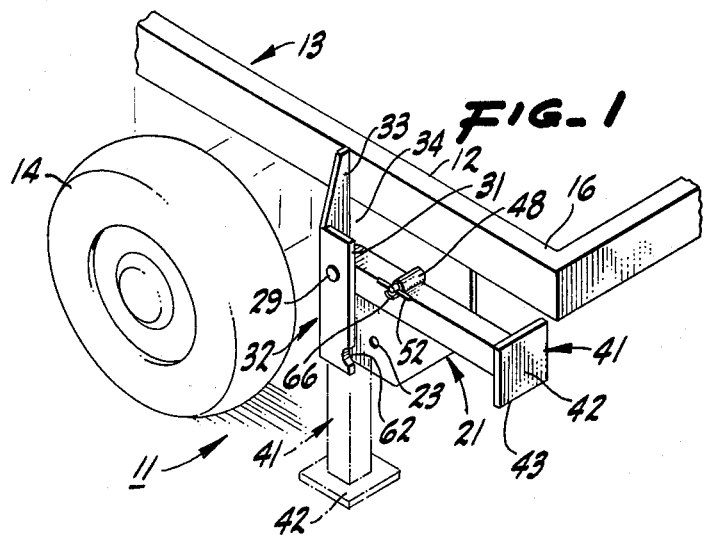
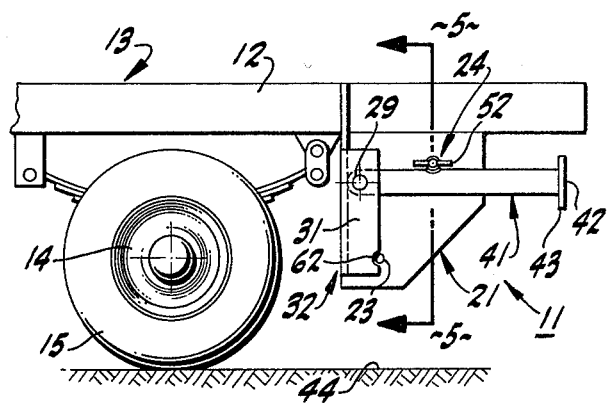
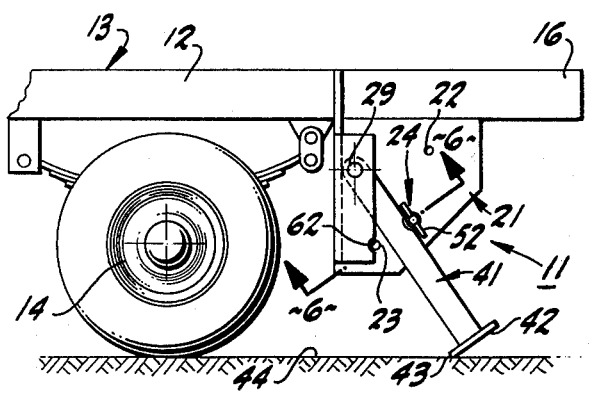
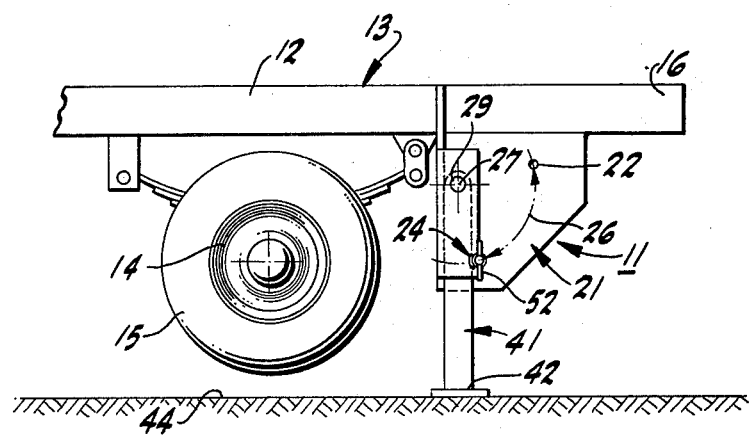

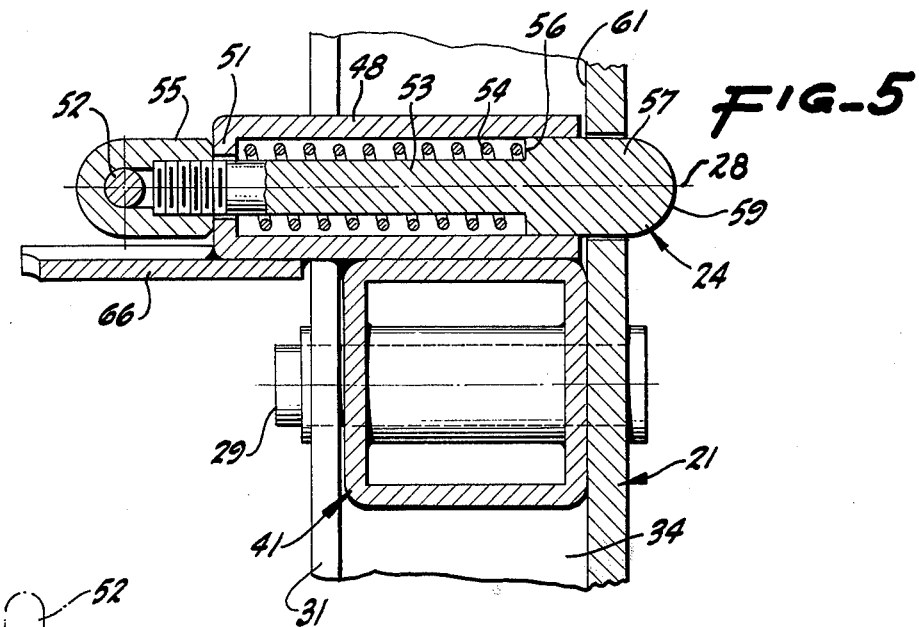
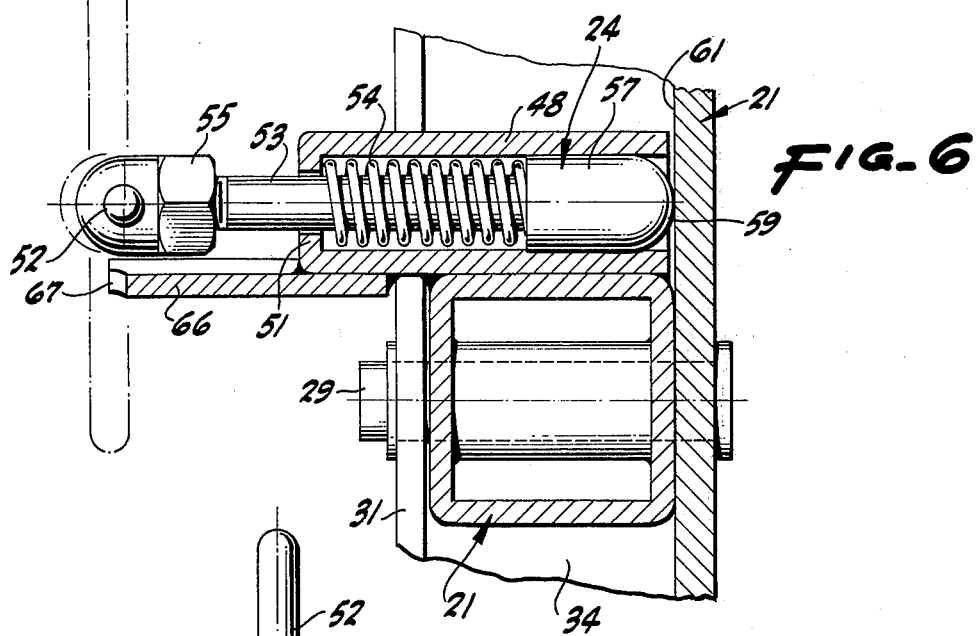
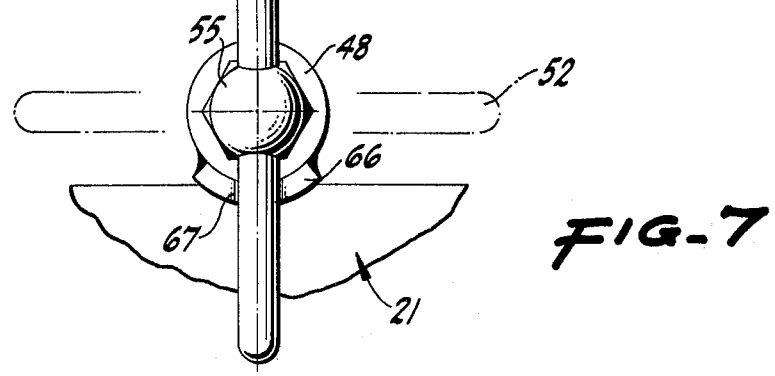

TRAILER JACK

BACKGROUND OF THE INVENTION

The market place as well as the patent literature are not without examples of vehicle jacks of the tilt up variety. U.S. Pat. Nos. 2,012,554 to Travis and 2,108,888 to Gunter disclose variations on the broad concept. Also of interest are U.S. Pat. Nos. 3,733,051 to Bollinger and 3,744,757 to White.

Despite the foregoing, however, there is still considerable room for improvement.

SUMMARY OF THE INVENTION

The invention relates to a tilt up jack for especial use in connection with elevating the wheel of a trailer, such as a boat trailer, to facilitate the changing of a wheel with a flat tire.

It is an object of the invention to provide a tilt up jack which is light in weight, compact in size and safe, quick and reliable in operation.

It is another object of the invention to provide a tilt up trailer jack which can either be installed at the factory or, by using a kit, subsequently thereto.

It is still a further object of the invention to provide a tilt up trailer jack which is relatively economical, has but few moving parts to get out of order and can be operated even by persons having but a small degree of mechanical aptitude.

It is another object of the invention to provide a generally improved tilt up trailer jack.

Other objects, together with the foregoing, are attained in the preferred embodiment described in the following description and illustrated in the accompanying drawings.

BRIEF DESCRIPTION OF THE DRAWINGS

FIG. 1 is a rear perspective view showing a tilt up jack installed on one side of a trailer, various trailer components such as supporting springs, rear lights and license plate being removed to clarify the disclosure;

FIG. 2 is a fragmentary side elevational view showing the jack leg in horizontal storage position;

FIG. 3 is a view comparable to FIG. 2, but with the leg in intermediate inclined position and the toe of the foot plate in engagement with the ground, preparatory to backing the trailer so as to tilt the leg into vertical attitude;

FIG. 4 is a view comparable to FIGS. 2 and 3 but with the leg locked in vertical position and the trailer tire elevated above ground level to facilitate changing of the wheel;

FIG. 5 is a fragmentary sectional view, to an enlarged scale, of the latch structure with the pin in projected position, the plane of the section being indicated by the line 5 — 5 in FIG. 2;

FIG. 6 is a view similar to that of FIG. 5, but with the latch pin in retracted position, the plane of the section being indicated by the line 6 — 6 in FIG. 3; and, FIG. 7 is a fragmentary front elevational view of the latch pin mechanism showing the cross handle rotated 90°.

DETAILED DESCRIPTION OF PREFERRED EMBODIMENT

The trailer jack of the invention, generally designated by the reference numeral 11, is customarily installed in pairs, one on each of the longitudinal frame channels 12 of a trailer 13. The preferred location is between the adjacent trailer wheel 14 and the after end 16 of the channel 12.

Mounted on and depending from the channel 12 is a fore and aft sector plate 21 having formed therein an upper after opening 22 and a lower forward opening 23 to receive a latch pin 24. The openings 22 and 23 are disposed in an arc 26 (see FIG. 4) the center 27 of which is on the horizontal transverse axis 28 of a pivot pin 29.

The pivot pin 29 is mounted at the inner end in the sector plate 21 and at the outer end in the outer flange 31 of an angle iron 32 connected to the channel 12 and the sector plate 21 as by welding.

The forward end of the angle iron 32 comprises a web 33; and with the adjacent sector plate and flange, the web forms a vertical, U-shaped in section enclosure 34, the purpose of which will subsequently be described.

Pivotally mounted on the transverse pin 29 for rotational movement in a vertical, fore and aft plane is a jack leg 41 having mounted on the distal end thereof a foot plate 42 with a toe 43 which engages the ground 44 in intermediate position of the pivoted leg 41 (see FIG. 3).

When the jack is not in use, the leg 41 is retained in horizontal attitude by a detent device including the latch pin 24 which is translatable, within limits, in a sleeve 48 mounted transversely on the upper edge of the jack leg 41 (see FIG. 1).

The outer end of the sleeve 48 is constricted by an annular flange 51 which serves as a limit stop to a nut 55 threaded to the outwardly protruding portion of the pin stem 53. Mounted on the nut 55, in turn is a cross handle 52. Abutting the inside of the annular flange 51 is one end of a compression spring 54, the other end of which engages an annular shoulder 56 formed by the junction of the stem 53 and the latch pin head 57.

The spring 54, in other words, urges the latch pin head 57 inwardly toward the sector plate 21.

When the jack leg 41 is in horizontal attitude, the latch pin 57 projects through the upper after opening 22 in the sector plate 21 and thereby securely anchors the leg 41 in its inactive, or storage, position (FIGS. 1 and 2).

When the jack leg is in intermediate position (FIG. 3), the innermost, or nose, end 59 of the latch pin head 57 abuts the outer surface 61 of the sector plate 21 and the latch pin 24 is in retracted position.

With the jack leg 41 in vertical, operative position (FIG. 4 and broken line in FIG. 1), the latch pin 24 projects through the lower forward opening 23 in the sector plate 21 and securely anchors the leg 41 in vertical attitude.

Further security is afforded the vertical jack leg 41 by the encompassing three walls formed by the angle iron flange 31, the web 33 and the sector plate 21. Still further rigidity is provided by the engagement between the sleeve 48 and an arcuate recess 62 formed in the after lower edge of the angle iron flange 31 (FIG. 1).

The trailer jack is put into operation when it becomes necessary or desirable to change a wheel 14 because the tire 15 has become flat, for example.

Assuming the left wheel is to be changed, the operator stops the towing vehicle and after setting the brakes approaches the left hand jack. The operator then grips the jack leg 41 with one hand while gripping the cross handle 52 of the latch detent mechanism with the other hand. By pulling outwardly on the handle 52 against spring urgency, the latch pin head 57 is withdrawn from the opening 22 in the sector plate.

While holding the pin 57 in retracted position the jack leg 41 is lowered somewhat, at which point the cross handle 52 can be released. The spring 54 urges the nose 59 of the latch pin into abutment with the adjacent surface 61 of the sector plate 21, the nose sliding down the surface 61 as the leg is urged downwardly to the intermediate position shown in FIG. 3, in which the toe 43 of the foot plate 42 engages the ground 44. During this step the latch pin necessarily remains in retracted position.

At this juncture, the operator can, by releasing the brakes and slowly driving the towing vehicle rearwardly a few inches, cause the foot plate 42 to rock back and down into horizontal attitude (see FIG. 4 and broken line in FIG. 1) in which position it serves as a pad supporting the trailer weight superimposed upon the vertical jack leg 41. The brakes of the towing vehicle are then locked.

In vertical position the jack leg is securely confined within the enclosure 34 and the latch pin 24 is projected by the spring 54 into the registering lower opening 23, the web 33 serving as a limit stop as the leg is brought into vertical posture.

Since the distance between the axis 28 of the pivot pin 29 and the bottom of the foot plate 42 exceeds the radius of the trailer wheel 14, the wheel 14 is elevated above ground level 44 when the jack leg 41 is in vertical posture, thereby facilitating the removal and replacement of the wheel 14.

While replacement is being effected, the three walls encompassing the jack leg securely hold the trailer against lateral and rearward displacement of the leg. Forward relative displacement is resisted by the latch pin 24 in engagement with the walls of the lower opening 23 and the abutment of the sleeve 48 against the walls of the arcuate recess 62 in the lower after edge of the angle iron flange 31.

After the wheel has been replaced, the operator continues to keep the towing vehicle brakes locked. Then, by gripping the cross handle 52, pulling outwardly on the pin against spring urgency, and rotating the cross handle through 90°, the latch pin is not only disengaged from the opening 23 but is held in open, or retracted, position by reason of the abutment between the cross handle 52 and a boss 66 projecting outwardly from the lower portion of the sleeve flange (see FIGS. 1 and 5–7). For even greater security, an arcuate recess 67 is formed in the outer end of the boss 66 to receive the cross handle 52 when the cross handle 52 is rotated 90° (see FIGS. 6 and 7).

With the latch pin 24 held open, the operator returns to the towing vehicle, unlocks the brakes and slowly drives ahead a few inches so that the jack leg 41 returns to intermediate position, as in FIG. 3, while the trailer wheel tilts downwardly into trailer supporting engagement with the ground.

The operator then returns to the jack, grips the cross handle 52 withdraws it from the recess 67 and rotates it through 90° until the cross handle is clear of the boss 66. The cross handle 52 is then released. Concurrently, the jack leg 41 is returned to horizontal position so that when the latch pin 24 is in registry with the opening 22 the spring 54 urges the latch pin 24 into re-engagement with the opening 22 in the sector plate, thereby completing the cycle.

Although the foregoing procedure is facilitated by the use of more than one person it can be seen that a single operator is capable of expeditiously elevating a wheel above ground level with a minimum of effort yet with safety and dispatch.

With particular reference to FIG. 1 where the jack leg 41 is shown in vertical position in broken line and to FIG. 4, it is to be noted that by making the jack leg 41 in the form of two telescoping sections with registering openings to receive a cross pin, the length of the jack leg 41 can be adjusted to conform to the wheel diameter of the particular trailer on which the jack 11 is installed.

It is also to be observed that by installing one of the jacks 11 adjacent each corner of a mobile home, or house trailer, and by interposing a conventional jack (such as a screw jack or ratchet jack or a pneumatically or hydraulically actuated jack) between the jack leg 41 and the foot plate 42, a ready means is provided for leveling the trailer.

It can therefore be seen that the trailer jack of the invention is versatile in that it can be used to advantage in several different environments.

What is claimed is:

1. A tilt up jack for a trailer having a pair of longitudinal frame channels spring mounted on ground engaging wheels, said jack comprising on each of said channels:
   a. a fore and aft sector plate mounted on said channel and depending therefrom;
   b. an angle bar mounted vertically on said channel adjacent the forward end of said sector plate, said angle bar including a transverse web and a fore and aft flange, said web and said flange forming with said sector plate an elongated vertical U-shaped in section enclosure;
   c. an elongated leg;
   d. pin means for pivotally mounting one end of said leg on said sector plate for movement of said leg in a vertical plane between a first position in which said leg extends aft in a substantially horizontal attitude, a second position in which said leg extends downwardly and aft, and a third position in which said leg is vertical and is located within said enclosure;
   e. a foot plate mounted on the other end of said leg; and,
   f. latch means for selectively securing said leg in said first and said third positions, the distance between said pin means and the bottom of said foot plate being greater than the radius of the trailer tire so that the trailer tire is elevated above ground level when said leg is in said vertical third position, said latch means including a sleeve mounted transversely on said leg, a latch pin slidably disposed within said sleeve, and means carried on said sleeve for limiting the movement of said latch pin between a retracted location removed from said sector plate and a projected location in which one end of said latch pin extends into a latch pin opening in said sector plate.

2. A tilt up jack for a trailer as in claim 1 in which said latch means further includes an upper latch pin opening in said sector plate for engagement with said latch pin in said horizontal first position of said leg; and a lower latch pin opening in said sector plate for engagement with said latch pin in said vertical third position of said leg.

3. A tilt up jack for a trailer as in claim 2 in which said latch means further includes a spring disposed within said sleeve and in engagement with said latch pin, said spring urging said latch pin toward said projected location.

4. A tilt up jack for a trailer as in claim 3 in which said latch pin limiting means includes a boss mounted on said sleeve and projecting outwardly therefrom; and a cross handle mounted on the outer end of said latch pin, said cross handle being in engagement with said boss in a first angular position of said latch pin and in said retracted location of said latch pin, said cross handle being out of engagement with said boss in a second angular position of said latch pin angularly displaced 90° from said first angular position of said latch pin and in said projected location of said latch pin.

* * * * *